United States Patent Office 3,383,182
Patented May 14, 1968

3,383,182
SEPARATION PROCESS OF THORIUM FROM RARE EARTH METALS
Mohamed K. Saad El-Din Sherief The Caire, and Andor Almásy, Veszprem, Hungary
No Drawing. Filed Oct. 29, 1965, Ser. No. 505,750
4 Claims. (Cl. 23—318)

This invention relates to the separation of thorium from a solution containing a considerable quantity of rare earth metals in one step.

It is known that thorium occurs in its valuable minerals together with a great quantity, generally with at least one scale greater quantity of rare earth metals. Since the thorium and the rare earth metals show in their compounds a great similarity their chemical separation is a considerably difficult process. The separation processes described in literature mean generally nothing but a 2- or 3-fold concentration of the thorium.

The separation is complicated further by the fact that if it is to be improved with a complex-forming agent, then the cerium having four valences displays a great similitude to the thorium and renders impossible the separation thereof. Thus it is comprehensible that e.g. Feldman (Feldman, M.L.: Solvent Extraction of Aqueous Solutions of Rare Earths, Solvent Extraction of Thorium and Rare Earths from Aqueous Solution of Monazite Sand Recomposed With Sulfuric Acid, USAEC Report ISC–67, Iowa State College 1949), in the course of selective extraction possibilities has examined 22 solvents but has not found an adequate selectivity in any of the solvents. The same fact has been established by the authors Whatley and Bridger (Whatley, M.E. and Bridger, G.L.: Solvent Extraction of Solutions Containing Rare Earths, USAEC Report ISC–115, Iowa State College, 1950) who have treid almost every solvent available on the market and have found that thorium cannot be advantageously extracted from a sulphuric acid monazite solution. It can equally be motivated by the chemical similarity that hitherto no process could be found on an industrial scale for the ion exchange separation of thorium from rare earth metals (Calkins, G. D. et al.: Recovery of Thorium and Uranium from Monazite Sands, Quarterly Report from Aug. 15 to Nov. 15, 1949, USAEC Report BMI–217 Battelle Memorial Institute 1949 and Calkins, G. D. et al.: Recovery of Thorium and Uranium from Monazite Sand, Final Report, vol. II, USAEC Report BMI–243 A. Battelle Memorial Institute, 1950).

For ion exchange separation the sulphuric acid solutions have proved to be the most effective. It is known that the $Th^{+4}$ ion combines with sulphate ions to form a complex compound according to the reaction scheme:

$$Th^{+4} + nSO_4^{--} \rightleftharpoons (Th/SO_4/_n)^{4-2n}$$

wherein $n$ stands for the number of $SO_4^{--}$ ligand ions, which may assume the values of 3, 4 or 5 according to various circumstances.

The formed complex anions would render possible in principle the application of anion and cation exchange resin for such separation process.

In the case of anion-exchange processes anion-exchange synthetic resins containing basic groups bind chemically the anions of greater affinity, and replace them by the dissolved anions bound originally. Since this latter phenomenon also changes the structure of the solvent, it may influence in a disadvantageous way the desired separation.

The effect of the separation has been tested with various sulphuric acid concentrations (0.5 and 1 mol) on strongly basic anion-exchange synthetic resins. The results show that the separation is not total and that the capacity of the anion-exchange synthetic resin on the thorium is very slight. Separation can only be realized on a large column and at a slow flow rate.

More favourable results may be attained in the case of cation exchange synthetic resins. The separation method suggested by Sherrington (BP 870 950, June 21, 1961) is known, according to which from a monazite solution containing 2.7 mol $H_2SO_4$ the thorium can be obtained with a cation exchange synthetic resin column, while the rare earth metal ions are adsorbed. The results obtained while reproducing this process are shown below:

Preparation of the starting solution:

86 g. monazite in 1 liter
Concentration of solution: 2.7 M $H_2SO_4$
Cation-exchange column: 300 ml. of "Varion KS" strongly acidic cation exchange synthetic resin washed to equilibrium with 2.7 M $H_2SO_4$.

| Receiver No. | Weight of solution in the receiver, g. | $ThO_2$ conc., mg./g. | RE-oxide conc., mg./g. | $ThO_2$ conc. in the oxide | $Th_2$ in t'e receiver, g. |
|---|---|---|---|---|---|
| 1 | 112 | 0.03 | 0.24 | 11.9 | 0.004 |
| 1 | 110 | 7.01 | 5.34 | 56.7 | 0.77 |
| 3 | 117 | 4.18 | 22.76 | 15.5 | 0.49 |
| 4 | 116 | 4.46 | 29.91 | 13.0 | 0.51 |

On the basis of the results of this experiment the direction of the expected effect could be established i.e. there is a tendency for thorium to flow through the cation-exchange column without being adsorbed, on the other hand, the rare earths, however, are not being tightly fixed on the resin but behaved nearly like thorium, so its quantity in the third receiver is already more than that of thorium. Consequently, only 16% of the initial $ThO_2$ could be obtained in a concentration exceeding 50%.

In the course of further experiments we succeeded to establish that by decreasing the acid concentration the separation effect could be improved to a certain extent. Best results were obtained at a 2 M $H_2SO_4$ concentration. The results of this experiment are shown in the following table.

Preparation of the starting solution:

21.5 g. monazite in 250 ml.
Concentration of solution 2 M $H_2SO_4$

Cation-exchanging column: 300 ml. Varion KS strongly acidic cation exchange resin washed to equilibrium with 2 M $H_2SO_4$.

| Receiver No. | Solution's weight in the vessel, g. | $ThO_2$ conc., mg./g. | RE-oxide conc., mg./g. | $ThO_2$ conc. in oxide, percent | $ThO_2$ in the receiver, g. |
|---|---|---|---|---|---|
| 1 | 109 | 0.56 | 0.51 | 52.6 | 0.06 |
| 2 | 109 | 3.48 | 0.55 | 86.4 | 0.38 |
| 3 | 71 | 3.24 | 2.22 | 59.4 | 0.23 |
| 4 | 108 | 4.13 | 8.81 | 31.9 | 0.45 |
| 5 | 112 | 0.51 | 19.45 | 2.5 | 0.06 |

In the course of the experiment the fast running down of the Th can be observed, while the elution of the rare earth metals starts much later—yet, results are unsatisfactory. Oxides obtained from the samples are in every case brown, this means mainly a Ce contamination.

This recognition has led us to the consideration that the chief impediment of the separation consists of the presence of $CE^{4+}$ ion in the sulphuric acid solution (which may be formed also by the oxidation of $Ce^{+3}$ ions by the effect of air). It is a well known fact that cerium (IV) compounds show a great similarity in their behavior to the thorium (IV) compounds, thus for instance they incline to form anion complexes.

It has been found that the separation of thorium from rare earth metals can be carried out very successfully if a sulphuric acid solution is formed from the starting material, the cerium (IV) compound, present in the sulphuric acid is reduced with a reducing agent and then an ion-exchange is effected. The concentration of the sulphuric acid used is adjusted to a value of about 2 mol free acid content. As a reducing agent sulphur dioxide or hydrazine sulfate are used. According to the invention ion-exchange is best carried out with a strongly acidic cation-exchange resin.

The described separation process in the present invention is thus based upon the fact that into a sulphuric acid solution containing rare earth metals and thorium such reducing agents are added which even in excess do not hinder the separation, assure the presence of the anion complex of thorium in the solution and in the meantime reduce the cerium (IV) ion into cerium (III) ion. Adding the reducing agent in excess is necessary in order to avoid the oxidation of the solution upon contacting air. The above requirements are met by the introduction of $SO_2$ gas, i.e. the saturation of the solution with $SO_2$. The reduced solution passing through a strongly acidic cation exchange resin column, first noticed that that thorium passes in the form of an anion-complex and only after the major part of thorium has been passed through the rare-earth metals begin to appear in the effluent.

The advantages of this procedure as compared to those known hitherto are the following:

(1) It carries out in one step the separation of thorium of the rare earth metals by means of cation exchange resin using cheap chemicals. It is known that the most economic way of recovering thorium metals (e.g. of monazite sand) is the recovery with sulphuric acid, the product of which—after diluting to 2 M free acid—can be directly used for the separation.

(2) The use of a reducing agent (e.g. sulphur dioxide or hydrazine sulphate) in the solution for the reduction of $Ce^{4+}$ ions is both handy and economic, assuring in the meantime the great purity of the thorium.

(3) The use of sulphur dioxide is especially advantageous, since neither the $SO_2$, nor the products formed in the course of reduction hinder the separation. Furthermore the excess in sulphur dioxide—i.e. the saturation of the solution—makes it possible to undertake the separation in a normal air atmosphere, since it impedes the re-oxidation of the $Ce^{3+}$ ions.

In order to elucidate the details of the procedure according to the invention we present the following example.

To effect the separation an ion-exchange column of 9.7 cm. inner diameter has been prepared, filled with 10 liters of Varion KS type, strongly acidic cation-exchange synthetic resin and treated with 2 M $H_2SO_4$. Hereafter the solution of 516 g. monazite, diluted to a volume of 6 liters and containing in this state 2 M of free sulphuric acid is saturated with sulphur dioxide by passing gaseous sulphur dioxide which is passed through the column at a flow rate of 4.8 liters/hour. Hereafter the column has been washed with 31.5 liters of 2 M sulphuric acid and finally the regeneration has been carried out with 3 M $H_2SO_4$. In order to observe the separation the effluent has been collected in receivers and fractions have been analyzed separately. Data of the experiment are shown in the following table:

| Receiver No. | Solution in the receiver, l. | $ThO_2$ conc., mg./ml. | RE-oxide conc., mg./ml. | $ThO_2$ conc. in whole metal oxide, percent | $ThO_2$ in the whole receiver, g. |
|---|---|---|---|---|---|
| 1 | 2.25 | 0.02 | 0.07 | 24 | 0.05 |
| 2 | 1.80 | 1.73 | 0.00 | 100 | 3.11 |
| 3 | 1.80 | 4.18 | 0.00 | 100 | 7.53 |
| 4 | 1.80 | 4.10 | 0.00 | 100 | 7.37 |
| 5 | 1.80 | 3.93 | 0.00 | 100 | 7.07 |
| 6 | 1.80 | 0.67 | 2.93 | 19.0 | 1.20 |
| 7 | 1.50 | 0.39 | 6.74 | 5.5 | 0.59 |
| 8 | 2.00 | 0.32 | 10.71 | 2.9 | 0.65 |
| 9 | 1.00 | 0.59 | 12.84 | 4.4 | 0.60 |
| 10 | 1.00 | 0.42 | 10.82 | 3.8 | 0.43 |
| 11 | 1.50 | 0.64 | 10.89 | 5.6 | 0.97 |
| 12 | 1.50 | 0.41 | 12.68 | 311 | 0.62 |
| 13 | 1.50 | 0.12 | 9.55 | 1.2 | 0.17 |
| 14 | 1.50 | 0.06 | 5.41 | 1.0 | 0.08 |
| 15 | 1.00 | 0.06 | 6.53 | 0.9 | 0.06 |

Summing up the content of the receivers 2–5, diluting it to its two-fold volume, separating it with oxalic acid and heated it, the $ThO_2$ is obtained in white colour and great purity. Thus the yield of $ThO_2$ is 82.2%.

The thorium obtained in the course of the experiment in the receivers 2–5 is of such a purity that it can directly be used for the production with known methods of thorium of reactor purity.

What we claim is:

1. Method of separating thorium values from rare earth metal values including cerium values, which comprises forming a sulphuric acid solution of a mixture of said thorium values and rare earth metal values using an excess of sulphuric acid so that said solution contains free sulphuric acid; adding in excess a reducing agent selected from the group consisting of sulphur dioxide and hydrazine sulphate so as to convert cerium (IV) compounds present in said solution to corresponding cerium (III) compounds; passing the thus formed solution through a strongly acid cation exchange resin; and recovering the thorium values from the effluent.

2. Method according to claim 1, wherein the free acid content of the initially formed sulphuric acid solution is adjusted to a value of 2 molar.

3. Method according to claim 2, wherein said reducing agent is sulphur dioxide.

4. Method according to claim 3, wherein the solution is saturated with sulphur dioxide.

References Cited

UNITED STATES PATENTS 3,159,452  12/1964  Lerner  23—318

CARL D. QUARFORTH, *Primary Examiner.*

L. DEWAYNE RUTLEDGE, *Examiner.*

S. TRAUB, R. L. GRUDZIECKI, *Assistant Examiners.*